US005992019A

United States Patent [19]

May et al.

[11] Patent Number: 5,992,019

[45] Date of Patent: Nov. 30, 1999

[54] METHOD OF REPLACING HEATING TUBES OF A HEATING CHAMBER

[75] Inventors: Karl May, Bad Vilbel; Hartmut Herm, Dreieich; Karlheinz Unverzagt, Seligenstadt, all of Germany

[73] Assignee: Siemens Aktiengesellschaft, Munich, Germany

[21] Appl. No.: 09/023,952

[22] Filed: Feb. 17, 1998

Related U.S. Application Data

[62] Division of application No. 08/599,384, Feb. 9, 1996, and a continuation of application No. PCT/DE94/00866, Jul. 26, 1994.

[30] Foreign Application Priority Data

Aug. 9, 1993 [DE] Germany ............................ 43 26 678

[51] Int. Cl.[6] ...................................................... B23P 15/26

[52] U.S. Cl. ................................. 29/890.031; 29/402.03; 29/402.08

[58] Field of Search ......................... 29/890.031, 890.03, 29/402.03, 402.08

[56] References Cited

U.S. PATENT DOCUMENTS

| | | |
|---|---|---|
| 791,600 | 9/1905 | Anderson et al. . |
| 2,423,018 | 10/1947 | Griffoul . |
| 4,902,461 | 2/1990 | Schippers . |
| 5,220,957 | 6/1993 | Hance . |

FOREIGN PATENT DOCUMENTS

| | | |
|---|---|---|
| 0 149 798 A3 | 7/1985 | European Pat. Off. . |
| 0 302 310 A2 | 2/1989 | European Pat. Off. . |
| 0 665 463 | 8/1995 | European Pat. Off. . |
| 828839 | 5/1938 | France . |
| 2133518 | 12/1972 | France . |
| 422 941 | 2/1925 | Germany . |
| 599 382 | 6/1934 | Germany . |
| 2 514 352 | 10/1975 | Germany . |
| 38 30 153 A1 | 3/1990 | Germany . |
| 50-36459 | 11/1975 | Japan . |
| 57-36129 | 8/1982 | Japan . |
| 59-207346 | 11/1984 | Japan . |
| 11-09045 | 7/1989 | Japan . |
| 4-10204 | 1/1992 | Japan . |
| 51-9899 | 3/1993 | Japan . |
| 0 580 523 | 1/1994 | Japan . |

OTHER PUBLICATIONS

Patent Abstracts of Japan No. 59–207346, dated Nov. 24, 1984.

*Primary Examiner*—Irene Cuda
*Attorney, Agent, or Firm*—Herbert L. Lerner; Laurence A. Greenberg

[57] ABSTRACT

Method of replacing inner heating tubes in a heating chamber where the heating tubes are replaced by cutting the collars at pre-designated points on the two ends of the heating tube such that the welding seams holding the heating tube are removed. The collar containing a length compensator can be cut either before or after the length compensator depending on whether replacement of the length compensator is desired. The heating tubes are removed by moving the heating tubes out of the interior of the drum chamber through an opening in one of the two ends of the heating tube. New heating tubes containing an impact shell and a centering bushing, are inserted through an opening in one of the two ends of the heating tube. After a heating tube is inserted, the heating tube is raised such that the centering bushing can be inserted and centered in the collar. Then the heating tubes are welded at their two ends to the bushing of the collars.

1 Claim, 4 Drawing Sheets

METHOD OF REPLACING HEATING TUBES OF A HEATING CHAMBER

CROSS-REFERENCE TO RELATED APPLICATION

This is a division of application Ser. No. 08/599,384 filed on Feb. 9, 1996, and a Continuation of International Application Serial No. PCT/DE94/00866, filed Jul. 26, 1994.

BACKGROUND OF THE INVENTION

1. Field of the Invention

The invention relates to a heating chamber, particularly a low-temperature carbonization (LTC) chamber for waste, which is rotatable about its longitudinal axis and has a number of heating tubes located in the interior, each of the heating tubes being secured by one end thereof to a first end plate and by the other end thereof to a second end plate. The invention also relates to a method for replacing the heating tubes located in such a heating chamber.

The heating chamber is used for thermal waste disposal, especially by the low temperature carbonization (LTC) process.

The so-called LTC process has become well known heretofore in the field of waste disposal. This process and a system operating in accordance therewith for thermal waste disposal are described, for example, in the European Patent Publication EP-A-302 310 and and the German Patent Publication DE-A-38 30 153. The system for thermal waste disposal by the LTC process includes, as essential components, an LTC chamber (pyrolysis reactor) and a high-temperature combustion chamber. The LTC chamber converts the waste, which has been supplied thereto via a waste conveyor, into LTC gas and pyrolysis residue. The LTC gas and the pyrolysis residue, after suitable preparation, are then delivered to the burner of the high-temperature combustion chamber wherein a molten slag is produced therefrom. The molten slag is removed via an outlet and, after it has cooled down, appears in vitrified form. Via a flue gas line, flue gas which has been produced in the process is fed to a chimney serving as an outlet. A waste heat steam generator serving as a cooling device, a dust filter system, and a flue gas cleaning system, in particular, are built into this flue gas line.

The LTC chamber (pyrolysis reactor) is usually formed of a relatively long, rotating LTC drum having, in the interior thereof, a number of parallel heating tubes by which the waste is heated, largely with the exclusion of air. The LTC drum rotates about its longitudinal axis. Preferably, the longitudinal axis of the LTC drum is inclined somewhat from the horizontal, so that the LTC material collects at the outlet of the LTC drum and can easily be removed therefrom. As the drum rotates, the waste which has been raised drops onto the heating tubes located therebeneath. Because the waste can include heavy components, such as rocks, bottles, and metal and ceramic parts, a danger exists that the heating tubes may be damaged thereby. Besides this mechanical load or strain, a severe thermal strain of the heating tubes must also be considered. The LTC chamber may have a length of 15 to 30 m, so that it represents a significant capital investment.

SUMMARY OF THE INVENTION

It is accordingly an object of the invention to provide a a method of replacing inner heating tubes of a heating chamber allowing for the easy replacement of the heating tubes and hence an economic operation of a heating chamber.

With the foregoing and other objects in view, there is provided, in accordance with one aspect of the invention, a heating chamber rotatable about a longitudinal axis thereof and having a plurality of heating tubes located in the interior thereof, a first end plate to which each of the heating tubes is secured by an end thereof, a second end plate to which each of the heating tubes is secured by the other end thereof, at least one of the ends of each of the heating tubes protruding through a respective opening formed in at least one of end plates, and a respective collar for connecting the at least one end of the respective heating tubes to the outer surface of at least one end plate, comprising a respective reduced diameter portion formed in each of the heating tubes, the heating tubes being spaced from one another a greater distance at the at least one end plate than in the interior of the heating chamber.

In accordance with another feature of the invention, the heating chamber is a low-temperature carbonization chamber for waste material.

In accordance with a further feature of the invention, the collar includes a length compensator, in particular a corrugated tube compensator.

In accordance with an added feature of the invention, the length compensator is secured between a first bushing and a second bushing, the first bushing being connected at an end face thereof to a respective heating tube, and the second bushing being connected to the first end plate.

In accordance with an additional feature of the invention, the bushings and the heating tube and end plate respectively are connected to one another by weldment.

In accordance with yet another feature of the invention, the collar includes a tube plate bushing connected at one end thereof to a respective heating tube, and at the other end thereof to the second end plate.

In accordance with yet a further feature of the invention, the tube plate bushing is connected to the heating tube and to the second end plate by weldment.

In accordance with yet an added feature of the invention, the heating chamber includes a centering member disposed between the tube plate bushing and the respective heating tube.

In accordance with yet an additional feature of the invention, the heating chamber includes an impact shell disposed on each of the heating tubes.

In accordance with still another feature of the invention, the impact is formed as a steel half shell.

In accordance with still a further feature of the invention, the tube plate bushing has an inner diameter which is slightly larger than the outer diameter of the heating tube plus the thickness of the impact shell.

In accordance with still an added feature of the collar includes a bushing having an end thereof protruding out of an opening formed in the respective end plate, the bushing being welded at an end face thereof to the respective end plate in the interior of the heating chamber.

In accordance with a concomitant aspect of the invention, there is provided a method for replacing a heating tube secured at an end thereof in the interior of a heating chamber to a first end plate and at the other end thereof to a second end plate, which comprises cutting off a portion of a collar serving to to secure the heating tube, so that the remaining portion of the collar remains at the respective end plate; pulling the heating tube out of the interior of the heating chamber through an opening formed in one of the two end plates; inserting a new heating tube; and welding the new heating tube at an end face thereof to a remaining portion of the collar.

The is thus based on the thought that the aforementioned objects can be achieved if the especially heavily stressed components of the heating chamber are replaced after a given period of time. It is accordingly thus also an object of the invention to provide the foregoing method for simple replacement of a heating tube in such a heating chamber.

The first of these objects is accordingly attained in that the heating tubes are replaceably secured to the end plates.

The heating tubes should be relatively easily disposed replaceably between the two end plates. To accomplish this, a further feature provides that each of the heating tubes is detachable at the end thereof and is removable from the interior, respectively, through an opening formed in one of the two end plates.

To keep costs low, but also to assure rapid re-availability when routine work is performed, the replaceability of the heating tubes should be assured without requiring that work, such as welding, be necessary at the first and/or second end plate during the replacement operation. To achieve this, a further feature provides that one end of each of the heating tubes protrudes through a respective opening formed in the first and/or second end plate and is connected to the outer surface of the first and second end plate via a respective collar. The respective collar serves the purpose of disconnectably securing the heating tubes.

In a further feature, provision is made for the collar to include a length compensator, in particular a corrugated tube compensator. The length compensator can be secured between a first bushing and a second bushing, the first bushing and the second bushing being connected, in particular welded, respectively, to the applicable heating tube and the first end plate, respectively.

In a further embodiment, the collar includes a tube plate bushing, which is connected, particularly welded, at one end thereof to the applicable heating tube, and at the other end thereof to the second end plate.

With respect to the method for replacing a heating tube, the aforementioned object is attained in accordance with the invention by providing that a portion of the collar serving to provide the securing of the heating tubes is cut off, so that the remaining portion of the collar remains at the end plate; that the heating tube be pulled out of the interior through an opening formed in one of the two end plates; that a new heating tube be inserted; and that the new heating tube be welded at the end face thereof to the remaining portion of the collar.

Other features which are considered as characteristic for the invention are set forth in the appended claims.

Although the invention is illustrated and described herein as embodied in a heating chamber with inner heating tubes, and a method of replacing the heating tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
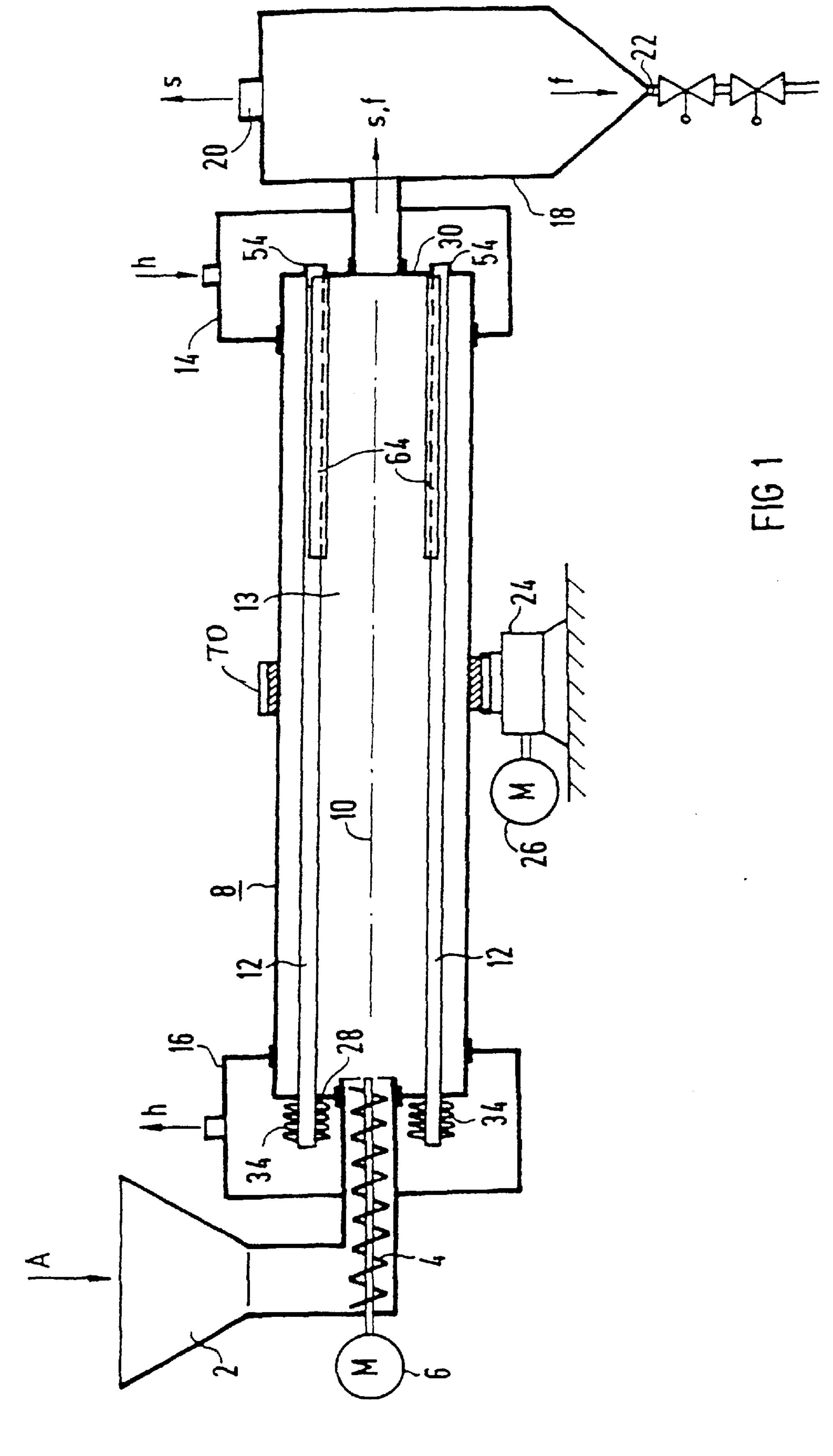
FIG. 1 is a diagrammatic side elevational view of an LTC plant with an LTC chamber for waste, in accordance with the invention, which is used for performing the LTC process.

Referring now to the drawings and, first, particularly to FIG. 1 thereof, there is shown therein solid waste A being fed into a pyrolysis reactor or LTC chamber 8 via a feed or charging device 2 and a worm 4, which is driven by a motor 6. The LTC chamber 8 in the exemplary embodiment is an LTC or pyrolysis drum which is rotatable about its longitudinal axis 10 by a drive 24, 26 to be described hereinafter, and operates at 300 to 600° C., largely with the exclusion of oxygen, and produces not only volatile LTC gas s but a largely solid pyrolysis residue f. A plurality of heating tubes 12, only two of which are shown, are mutually aligned parallel to one another in the interior 13 of the LTC drum 8. An inlet 14 is provided for hot gas h at a “hot” end of the LTC drum 8, and an outlet 16 for the hot gas h is provided at a “cold” end thereof. A longitudinal axis 10 of the LTC chamber 8 is preferably inclined relative to the horizontal, so that the “hot” end located at the right-hand side of FIG. 1 is at a lower level than the inlet for the waste A shown at the left-hand side of the figure. The pyrolysis drum 8 is followed, at the outlet or discharge side thereof, by a discharge device 18, which is provided with an LTC gas vent connecting piece or union 20 for venting the LTC gas s, and a pyrolysis residue outlet 22 for discharging the solid pyrolysis residue f. An LTC gas line connected to the LTC gas vent union 22 may be connected to a burner of a high-temperature combustion chamber. The rotary motion of the LTC drum 8 about the longitudinal axis 10 is effected by a drive 24, which also includes a motor 26. The drive 24, 26 operate, for example, on a toothed ring 70 secured to the circumference of the LTC drum 8.

It is apparent from FIG. 1 that the heating tubes 12, respectively, are secured by one end thereof to a first end plate 28, and by the other end thereof to a second end plate 30.

Figure 2:
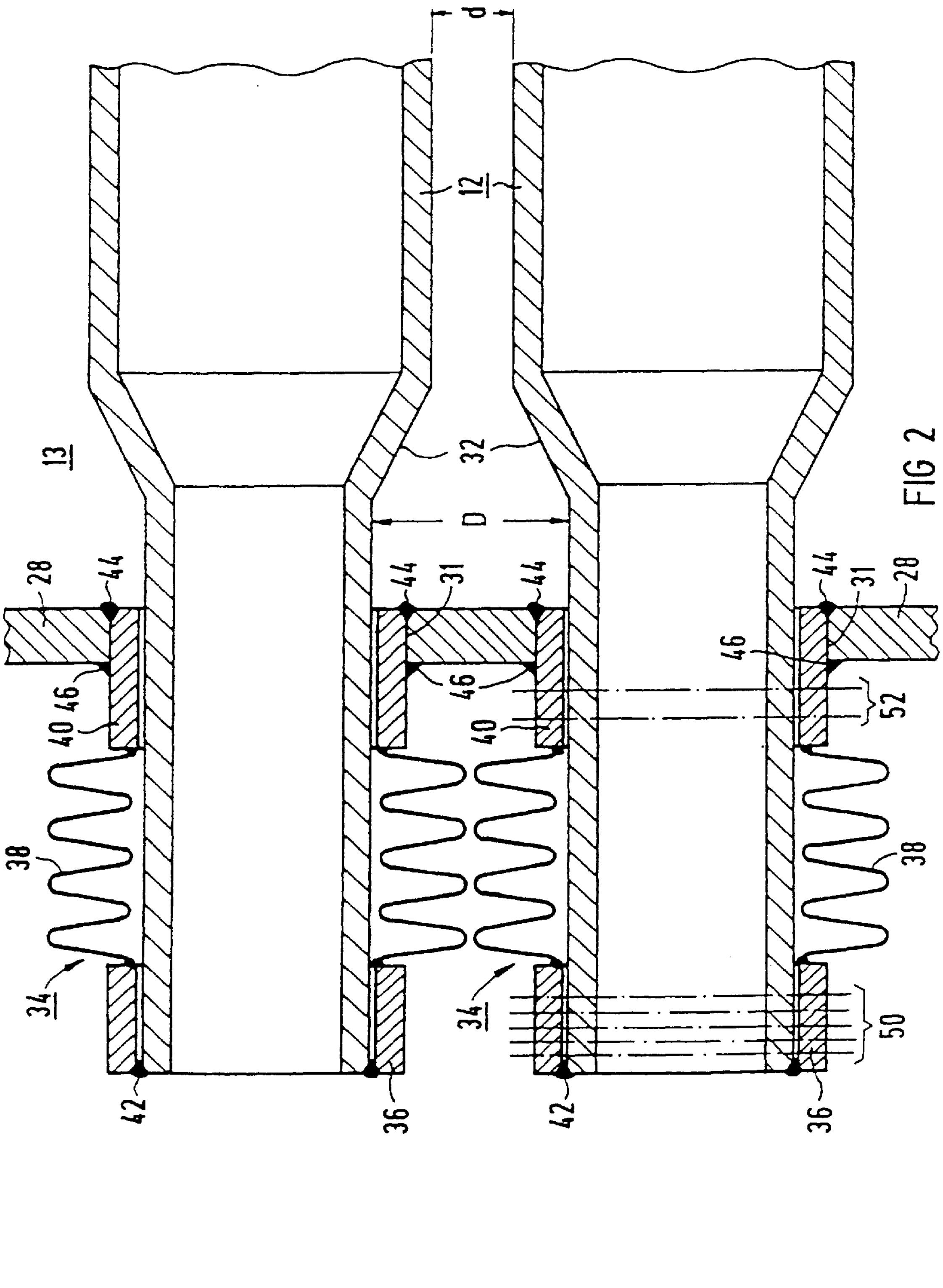
FIG. 2 is an enlarged fragmentary view of FIG. 1, showing in greater detail how individual heating tubes are secured in the LTC chamber at the cold side thereof which is located at the left-hand side of FIG. 1.
Figure 3:
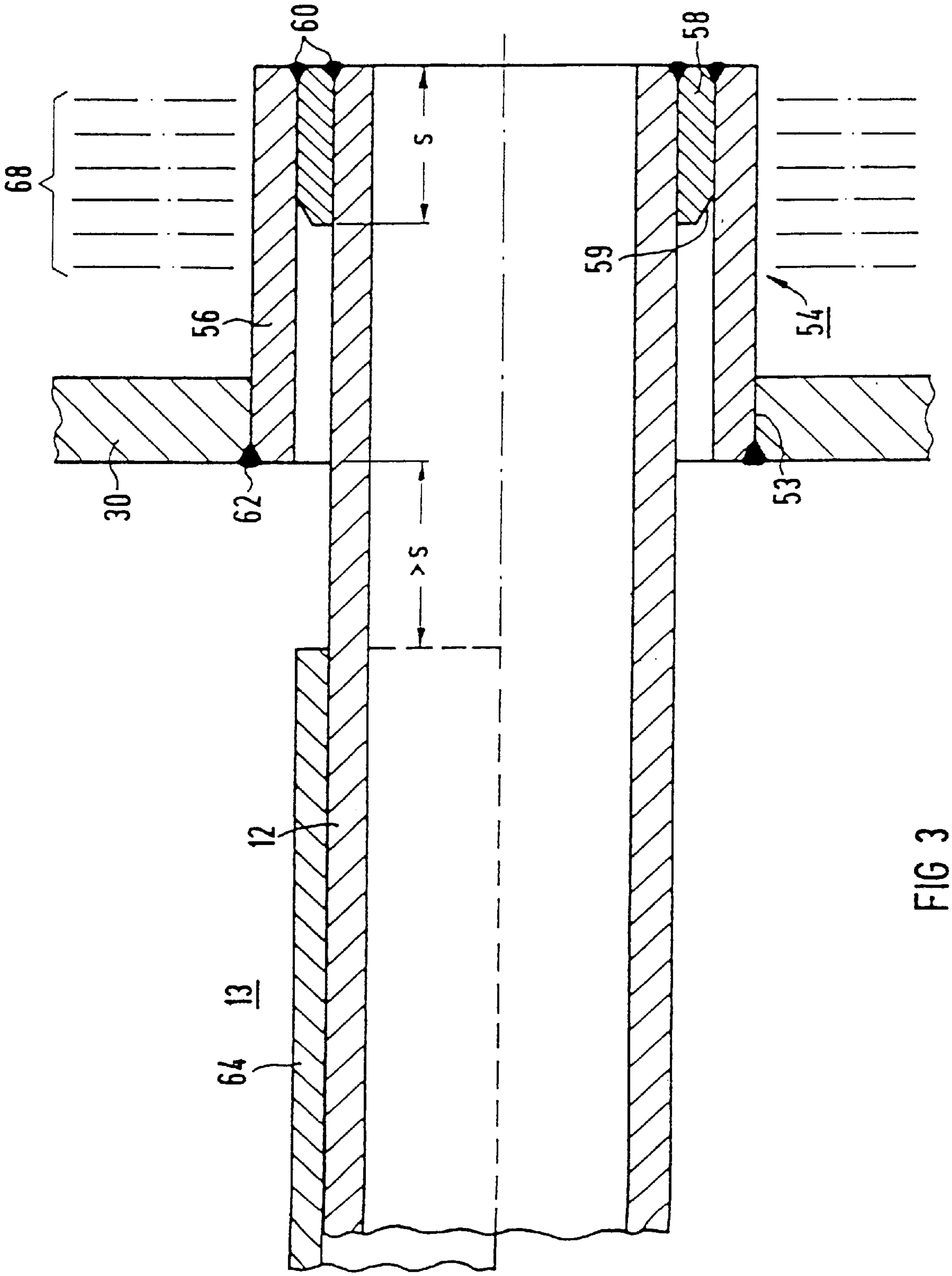
FIG. 3 is an enlarged fragmentary view of FIG. 1, showing in greater detail how an individual heating tube is secured in the LTC chamber at the hot side thereof which is located at the right-hand side of FIG. 1.
Figure 4:
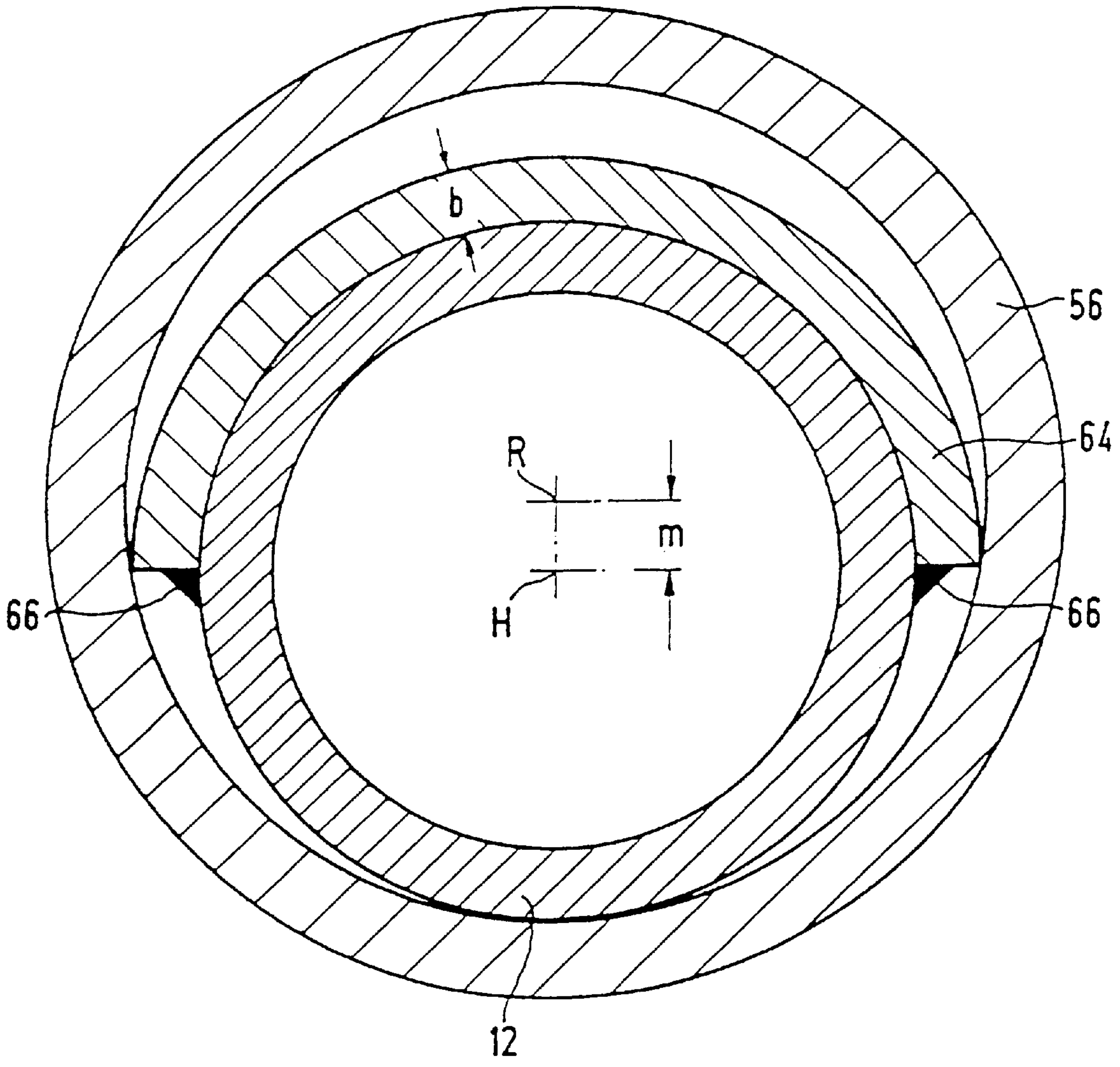
FIG. 4 is a cross-sectional view of the LTC chamber at the hot side thereof, showing an assembly including an introduced heating tube.

As shown in the further FIGS. 2 to 4, the heating tubes 12 are secured to the end plates 28 and 30 so as to be readily replaceable.

FIG. 2 shows, on a greater scale, how the heating tubes 12 are secured to the first, left-hand or “cold” end plate 28. The end of each of the heating tubes 12 protrudes from the interior 13 through a respective opening 31. The longitudinal axes 10, respectively, of the heating tubes 12, as shown in FIG. 1, are aligned perpendicularly to the surface of the end plate 28. In the construction shown, the fact that the individual heating tubes 12 are under a heavy load both thermally and mechanically, and that the first end plate 28, which can also be called the tube plate or tube base of the LTC drum 8, rotates about the longitudinal axis 10 of the LTC drum 8 have been taken into consideration. Also taken into consideration is that the spacing d between the heating tubes 12 in the interior 13 should be as close as possible, and the spacing D between the very same heating tubes 12 at the location whereat they are secured to the first plate 28 should be as far apart as possible, for reasons of production or installation. Finally, also taken into consideration is that, in the operation of an LTC drum 8 over the service life thereof, the heating tubes 12 should be replaced relatively often, length compensators should be replaced relatively seldom, and the end plate 28, if at all possible, should never be replaced. During the replacement of the heating tubes 12 and, if necessary or desirable, the length compensators, no work and, in particular, no welding work should be required at the first end plate 28. This applies analogously to the hereinafter explained procedure for securing the second end plate 30, as well.

The foregoing condition with respect to the spacings d, D is met by providing that each heating tube 12 include a reduced portion 32 at a location along the length thereof. This reduced portion 32 is located in the interior 13 of the drum chamber 8, just in front of or before the surface of the first end plate 28.

Each of the heating tubes 12 is secured at both ends thereof so as to be disconnectible relatively easily. The respective end of the heating tube 12 is secured to the first end plate 28 by means of a collar 34, which is formed of a connection in tandem of a first bushing 36, a length compensator 38, and a second bushing 40. The first and second bushings 36 and 40, respectively, are formed of steel and are to be regarded as tubular weld-on parts. The collar 34 surrounds the reduced-diameter end portion of the heating tube 12 which protrudes out of the interior 13 of the drum chamber 8. The first bushing 36 is joined at the end face thereof to the applicable heating tube 12 by a welding seam 42. The second bushing 40 is connected to the first end plate 28 by a welding seam 44, which is located in the interior 13 of the drum chamber 8, and optionally by a further welding seam 46 outside the drum chamber 8. The length compensator 38 is constructed, in particular, as a corrugated tube compensator. It is joined at both ends thereof to the inner ends of the tubular weld-on bushings 36 and 40 by otherwise non-illustrated welding seams.

The axial length of the bushings 36 and 40 is significant. The first bushing 36 may be provided with a suitably dimensioned axial length, for example, for five changes of the heating tube 12, and the axial length of the second bushing 40 may be dimensioned, for example, for two changes of the corrugated tube compensator 38. This is represented by five vertical phantom lines 50 and two vertical phantom lines 52, respectively, for the lower heating tube 12.

In the event of a change of the heating tube 12, the first bushing 36 is cut off along the first of the phantom lines 50, as viewed in FIG. 2, and the appertaining heating tube 12 is pulled to the right-hand side out of the interior 13 of the drum chamber 8. It is replaced with a new heating tube 12 which, after being inserted through the respective opening 31 in the first end plate 28 or, more specifically, through the combination of components 40, 38 and 36, is welded at its end to the bushing 36 with a new welding seam 42. As is clarified hereinafter, the procedure takes place in a corresponding manner at the "hot" end plate 30 located at the right-hand side of FIG. 1.

Conversely, if the corrugated pipe or tube compensator 38 is to be replaced, if necessary or desirable in addition to the heating tube 12, the second bushing 40 is cut off along the left-hand one of the two phantom lines 52 shown in FIG. 2. A new corrugated tube compensator 38 with a first bushing 36 mounted thereon can then be welded to the cut surface.

The construction shown in FIG. 2 assures a relatively easy, rapid and hence economical replaceability of the heating tubes 12 and length compensators 38, without having to perform any welding at the first end plate 28, possibly at inaccessible locations. This is especially significant commercially if one considers the fact that an LTC drum 8 contains from 100 to 200 heating tubes 12 which are secured to the end plate 28.

FIG. 3 illustrates how one of the heating tubes 12 is secured to the second or "hot" end plate 30 which is shown at the right-hand side of FIG. 1 and which likewise rotates about the longitudinal axis 10. Once again, the heating tube 12 protrudes from the interior 13 of the drum chamber 8 through an opening 53 formed in the end plate 30. A collar 54 is used to secure the heating tube 50. The collar 54 is formed of a length of ordinary metal pipe which performs the function of a tube plate bushing 56. A significant feature, in this regard, is that the inner diameter of the tube plate bushing 56 is slightly larger than the outer diameter of the heating tube 12. The spacing therebetween is spanned by a centering bushing 58, which is inserted at the end face after the heating tube 12 has been introduced into the tube plate bushing 56. The centering bushing 58 is provided at the inner end thereof with a bevel which is intended to make the introduction or insertion easier. The tube plate bushing 56 is joined at one side thereof to the appertaining heating tube 12 by welding seams 60, namely a front welding seam, and a mounting or assembly welding seam provided at the conclusion of the installation. The tube plate bushing 56 is also connected at the other end thereof to the end plate 30 by means of a welding seam 62 located in the interior 13 of the drum chamber 8.

In the exemplary embodiment illustrated in FIG. 3, the centering bushing 58 is required because the appertaining heating tube 12 is provided with an impact shell 64 of metal. This impact shell 64 may, in particular, be a half-shell which is welded from the outside onto the heating tube 12 by means of at least one stitch seam 66 (note FIG. 4). The impact shell 64 has a thickness b. It protects the heating tube 12 in the interior 13 of the drum chamber 8 from solid materials, such as pieces of glass, iron and ceramic which are lifted during the rotation of the LTC chamber 8 and then dropped down again, and thus prevents damage to the heating tube surface. This impact protection increases the time intervals during which the heating tubes 12 are replaced. The impact half-shells are oriented individually for each heating tube to oppose the direction in which the pieces of solid materials drop downwardly.

In the case at hand, the axial length of the tube plate bushing 56 is also selected so that it suffices for five changes of the heating tube 12. Once again, this is illustrated by vertical phantom lines 68 in FIG. 3.

FIG. 4 illustrates the mounting or assembly situation upon the introduction of a heating tube 12. The mounting or assembly process is described hereinafter in further detail in conjunction with FIGS. 3 and 4.

First, the tube plate bushing 56 is secured by means of the welding seam 62 in the opening 53 of the second end plate 30. It protrudes outwardly from the interior 13 of the drum chamber 8, that is, into the heating gas inlet 14, as shown in FIG. 1. Next, the heating tube 12 is brought from the right-hand side, as viewed in FIG. 3, to the opening 53 formed in the second end plate 30. The impact shell 64 is already secured to this heating tube 12 by means of the stitch seams 66; the centering bushing 58 is also already welded to it by means of the front or end seam 60. This thus madeready heating tube 12 is introduced or thrust into the tube plate bushing 56 from the right-hand side of FIG. 3. This situation is shown in FIG. 4. It is apparent that, upon the insertion thereof, the outer, lower jacket line of the heating tube 12 rests on the inner, lower jacket line of the tube plate bushing 56. The dimensioning is such that the inner diameter of the tube plate bushing 56, which should be as small as possible, is precisely slightly larger than the outer diameter of the heating tube 12 plus the thickness b of the impact shell 64. For purposes of illustration, in the mounting assembly situation of FIG. 4, the middle line of the heating tube 12 is identified as H, and the center line of the tube plate bushing 56 is identified as R, and the distance between the two center lines H and R is identified as M.

After being virtually completely inserted, the heating tube 12 is raised a distance corresponding to the spacing m. The center lines H and R are then made to coincide. The centering bushing 58 then fits into the tube plate bushing 56. In conclusion, the mounting or assembly seam 60 is then welded on the end face of the tube plate bushing 56 and the centering bushing 58.

In the event the heating tube 12 is replaced, the combination of the components 56, 58 and 12 of FIG. 3 are cut off along that one of the phantom lines 68 located farthest to the right-hand side of the figure. As explained hereinbefore, this also takes place at the cold end, as shown in FIG. 2. The heating tube 12 with the impact shell 64 mounted thereon can then be pulled to the right-hand side out of the interior 13 of the drum chamber 8 through the opening 53 or, more precisely, through the tube plate bushing 56, and replaced with a new heating tube 12. The process of installing this new heating tube 12 is performed in accordance with the principle already explained hereinabove. In the event of a further or next replacement, once again the combination of components 56, 58 and 12 is cut off, but then along the second phantom line 68, counting from the right-hand side of FIG. 3. Upon the third replacement, the cut-off takes place along the third phantom line 68 from the right-hand side of FIG. 3, and so forth. Each time, enough material remains yet at the tube plate bushing or sleeve 56 for applying the mounting or assembly welding seam 60.

We claim:

1. In a method for replacing a heating tube secured at one end thereof in an interior of a heating chamber to a first end plate and at another end thereof to a second end plate, the improvement which comprises:

cutting off a portion of a collar serving to secure a heating tube, so that a remaining portion of the collar remains at one of the end plates;

pulling the heating tube out of the interior of the heating chamber through an opening formed in one of the end plates;

inserting a new heating tube; and welding the new heating tube at an end face thereof to the remaining portion of the collar.

* * * * *